United States Patent [19]

Labb

[11] Patent Number: 4,635,117
[45] Date of Patent: Jan. 6, 1987

[54] METHOD AND DEVICE FOR LEVEL CORRECTION FOR A TELEVISION IMAGE

[75] Inventor: Georges Labb, Pontoise, France

[73] Assignee: Thomson CSF, Paris, France

[21] Appl. No.: 608,197

[22] Filed: May 8, 1984

[30] Foreign Application Priority Data

May 11, 1983 [FR] France ............................ 83 07905

[51] Int. Cl.⁴ .............................................. H04N 5/14
[52] U.S. Cl. .................................. 358/160; 358/163; 358/55
[58] Field of Search ............... 358/160, 161, 162, 163, 358/167, 168, 50, 51, 55, 80, 210, 27, 28, 37

[56] References Cited

U.S. PATENT DOCUMENTS 4,544,952  10/1985  Pham van Cang .................. 358/51

FOREIGN PATENT DOCUMENTS 2403703  4/1979  France .
2498858  7/1982  France .
2007934  5/1979  United Kingdom .
1586201  3/1981  United Kingdom .
2101459  1/1983  United Kingdom .

Primary Examiner—James J. Groody
Assistant Examiner—Michael D. Parker
Attorney, Agent, or Firm—Cushman, Darby & Cushman

[57] ABSTRACT

The system performs a correction on the video frequency signal of a television image, for the purpose of avoiding level defects in the image. The method principally consists in defining a particular number of correction points in the image by division into a grid or lattice of horizontal and vertical strips or bands, in imparting to the divisions of this grid a smaller value towards the edges of the image than close to the center, in storing correction signals for each correction point during an acquisition procedure, and in correcting the video frequency signals relating to a correction point by using the correction signal stored for this point.

5 Claims, 6 Drawing Figures

METHOD AND DEVICE FOR LEVEL CORRECTION FOR A TELEVISION IMAGE

The present invention has as its object to perform a level correction in a video frequency television signal, in such a manner as to correct the level defects in the television picture, for example such as spots and the degree of light modulation.

BACKGROUND OF THE INVENTION

The level defects in a television image derive in particular from the optical pickup system, from the image analyzer and from the receiving tube. However, these defects in level may be also introduced by devices for correcting color registration (convergence) and geometry.

It is known that level defects may be corrected by means of a cross correction system based on simple analog signals (sawtooth, parabolic) at line frequency and at frame frequency. The effectiveness of a correction of this nature is actually assured only over the small portion of the image in respect of which the correction signals were determined and which commonly consists of a cross + of which the intersection is situated at the center of the image.

It is equally known that level defects may be corrected by means of a device for correction by points, in which the television image is divided into a particular number of correction points by means to a squared grid of constant pitch: for example a grid divided into seven equal areas in the vertical direction and in the horizontal direction, establishing 49 correction points, or a 14×13 grid establishing 182 correction points. Experience shows that these devices do not for their part permit the elimination of the level defects of the television image in a satisfactory manner.

The present invention has as its object in particular to provide an improved correction of level defects in a television image compared with the known devices.

This is primarily obtained by means of a device for correction by points, in which the height and width of the correction points are not all identical and are the result of establishing a squared grid which is not of constant pitch and which is devised for the corrections which are to be performed.

SUMMARY OF THE INVENTION

According to the present invention, there is provided a method of correcting level defects for a television image, wherein the image is divided into a predetermined number of correction points by means of a grid of vertical and horizontal bands, wherein the grid has a varying pitch and wherein the length of the pitch of the grid is smaller towards the edges of the image than close to the center of the image.

BRIEF DESCRIPTION OF THE DRAWINGS

A better understanding of the present invention will be gained and other features will appear from the following description and from the accompanying drawings, in which:

FIG. 5 illustrates a word of eight bits, utilized in the invention.

DESCRIPTION OF THE PREFERRED EMBODIMENTS

The invention has as its basis, different observations made by the inventor in the laboratory, these being related to the location of level defects in the television image and the bands of the variation spectrum of the level defects.

Monitoring level defects demonstrates that these are particularly large and vary rapidly at the edges of the image. A device for correction by points in which the correction points would be obtained by means of a very small-meshed grid would be appropriate to eliminate these, but a device of this kind would need a memory of excessively large capacity, which would consequently be too costly, too bulky and use too much power, for retention of the correction signals applicable to the correction points. Furthermore, corrections of an unnecessarily small area would be performed in the central portion of the image by a device of this nature. The utilization of a variable pitch, diminishing as the distance of the correction point from the center of the image increases will render it possible to eliminate these shortcomings.

It has equally been observed that after color registration and/or geometry corrections performed by means of a first given number of correction points, very localized level defects appeared which could not be corrected by means of a level correction device of which the correction signals had been determined for the same correction points. As a matter of fact, the spectrum of the level variations produced in this manner has a troublesome line, in view of its energy, and this line occurs at the frequency corresponding to the frequency of the divisions establishing the correction points in the television image. A pitch equal to at least twice the pitch utilized to determine the color registration and/or geometry correction points will consequently be required to perform a level correction applicable to these very localized defects. To generalize, the frequency corresponding to the level correction pitch will be selected at least equal to twice the highest frequency amongst the troublesome lines of the spectrum of level variations.

The following description relates to a level correction device intended for a television analyzer for a television system having 625 lines per image, and two interlaced frames per image, with a nominal line period of 64 $\mu$S including 12 $\mu$S for line suppression, frames of 312.5 lines and a frame suppression period of 25 lines. This device is intended to correct level defects caused, in particular, by color registration and/or geometry corrections by means of image correction points established by division into a grid of the image which may amount to more than 20 divisions in the horizontal and vertical directions. Since the existing devices for color registration and geometry are based on a grid having fewer than 20 divisions in the horizontal and vertical directions, the level defects they engender may be corrected by the device described.

Figure 1:
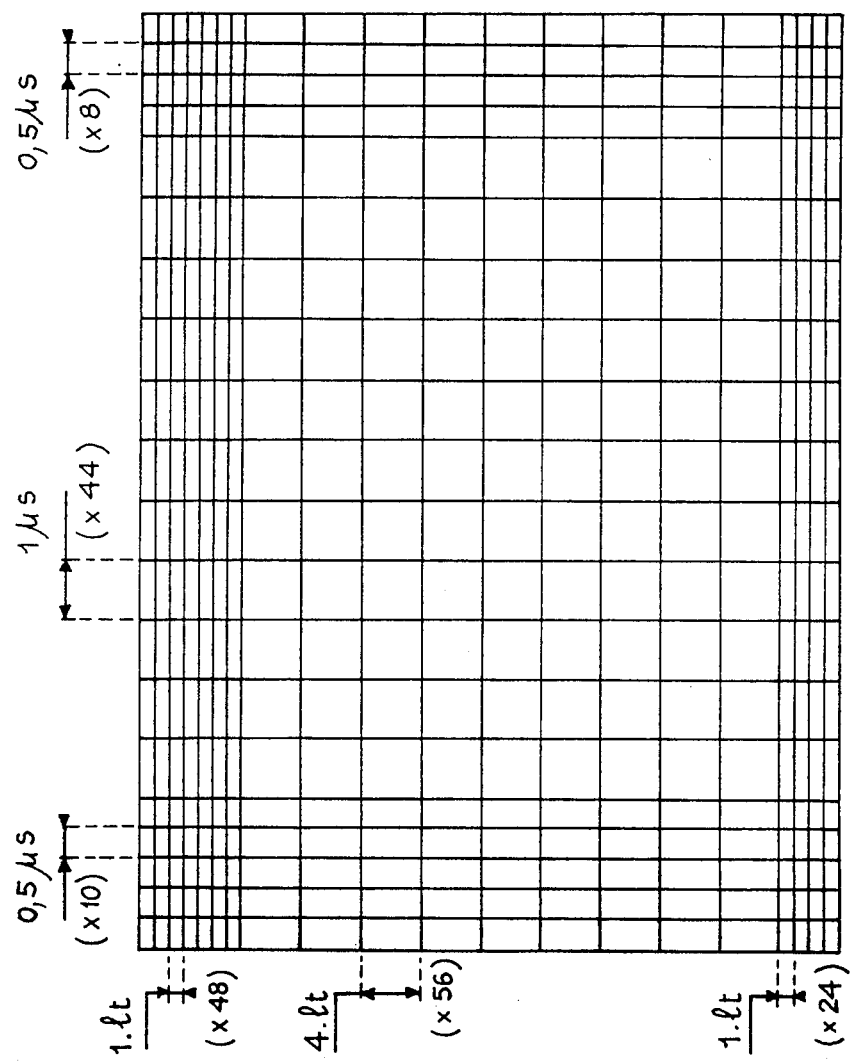
FIG. 1 illustrates a grid in accordance with the invention, for the television image.

FIG. 1 shows in a simplified mannner, the grid of the television image determining the level correction points. In the example described, the image was divided into a grid by vertical separation into 62 bands or strips (10 strips of 0.5 µS, 44 strips of 1 µS and 8 strips of 0.5 µS) and by horizontal separation into 128 bands or strips (48 strips of one frame line 1t, 56 strips of 4 frame lines and 24 strips of one frame line; one frame line 1t corresponds substantially to one three-hundredth of the height of the television image). In total, a correction is consequently performed by means of 62×128=7936 level correction points. In an endeavour to simplify and clarify the illustrations, the number of horizontal and vertical strips has been reduced appreciably in FIG. 1, which nevertheless provides a clear illustration of the divisions of the grid, thus showing that the level correction recurs more frequently in the image portions farthest from the center of the image than in the image portions close to the center. The actual numbers of divisions has been entered in FIG. 1, so that although the 44 vertical strips of 1 µS have been reduced to 11 in this Figure, it is shown in brackets that the actual number amounted to 44.

To perform a level correction of the video frequency signal of a color television analyzer, the conventional method which is also applied in the embodiment described herein, includes determining the correction signals of each primary color for the black spot and for the white spot utilized as reference views. The black spot is obtained by covering the objective of the camera, and the white spot by interposing a white screen in front of the camera lens. The correction signals obtained in this manner are added to the video frequency signal for those generated from the black spot and multiplied by the video frequency signal for those generated from the white spot, so that there are six correction arrangements in the level correction device, being two per primary color: one for the black level and one for the white level.

Figure 2:
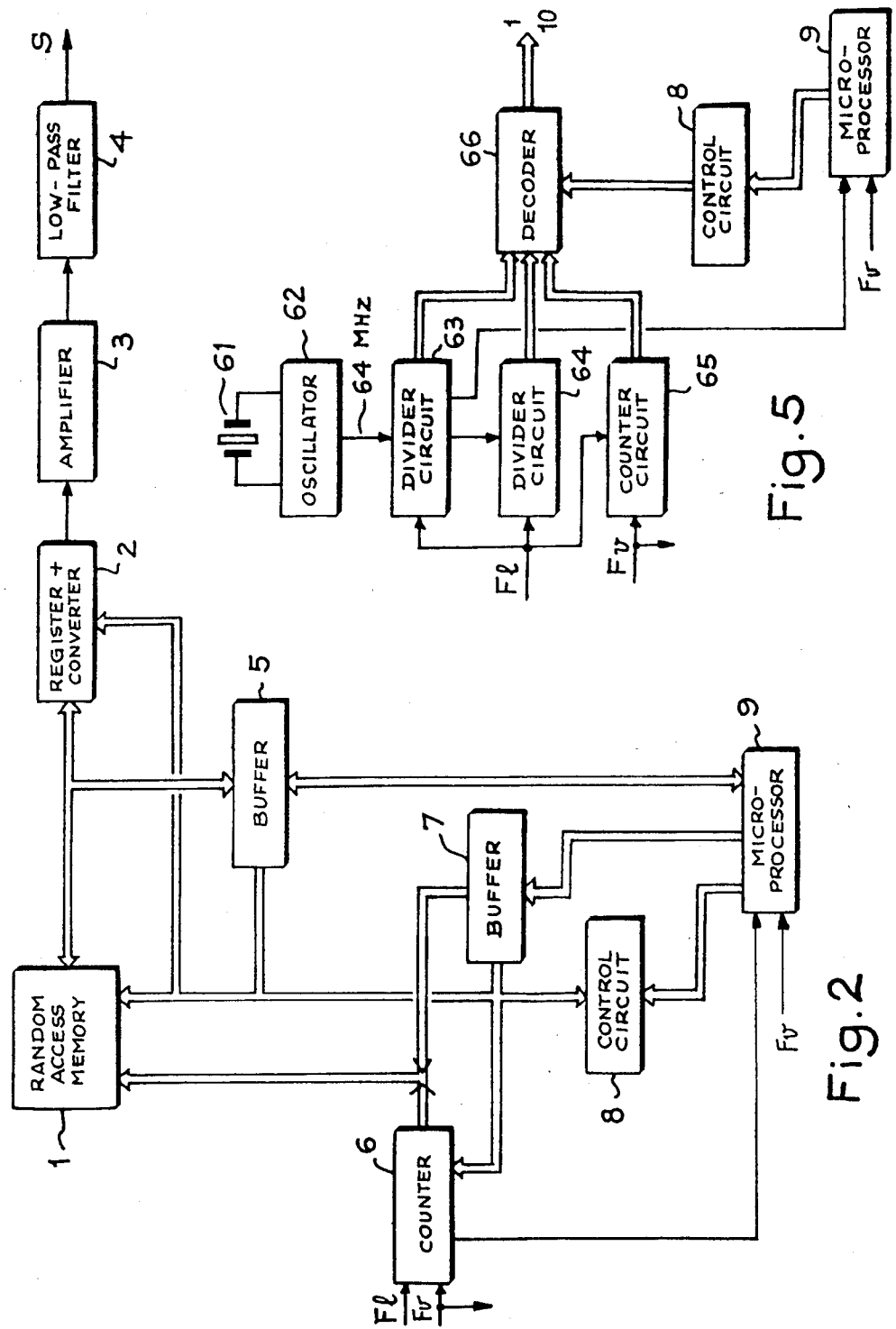
FIG. 2 illustrates a correction arrangement of a device in accordance with the invention.

FIG. 2 shows one of these six level correction arrangements, comprising circuits 1 to 5; the five other arrangements have not been shown since they are similar to the first. This correction arrangement operates in conjunction with the circuits 6 to 9 of FIG. 2 which equally serve for the operation of the other five level correction arrangements.

FIG. 2 shows a random access memory 1, of a capacity of 8K×8 or more specifically, of 8192 words of 8 bits or octets, which serves the purpose of storing the 7936 level correction signals which are applicable to the 7936 correction points referred to during the description of FIG. 1, for the primary color and the black or white level corrected by the assembly in question. The octets contained in the memory 1 are fed into a register 2 provided with a digital-analog output converter, and are then amplified in a wide-band operational amplifier 3. A low-pass filter 4 connected to the output of the amplifier 3 delivers the correction signal S.

A buffer stage 5 comprising bidirectional amplifiers, assures exchanges of data between the random access memory 1 and a microprocessor 9.

A buffer stage 7 makes it possible to address the memory 1 by means of the microprocessor 9 via a control and storage circuit 8 which is the switching and selection circuit, incorporating possible storage, controlled by the microprocessor 9.

Figure 6:
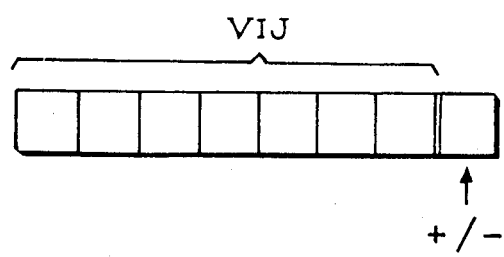
FIG. 6 illustrates a more detailed portion of the correction arrangement according to FIG. 2.

A counter 6, of which one embodiment is shown in FIG. 6, receives synchronizing signals at the line frequency Fl and at the frame frequency Fv utilised in the television camera. This counter describes the image and addresses—in step with the variable division (FIG. 1), the correction memory 1 of which the addressed octet is converted into an analog signal (circuit 2) which, after amplification and filtering, is combined as a correction signal with the video frequency signal. This combination of the video frequency signal with its correction signal S is obtained by means of a multiplier circuit or summator circuit which are not illustrated, depending on whether the memory 1 and consequently the signal S apply in respect of a correction of the white or black level.

The values contained in the memory 1 are safeguarded by a battery of accumulators, not shown, if the supply to the television camera is cut off.

The memory 1 comprises 8192−7936 =256 octets which do not serve the purpose of correcting the video frequency signal. A part of these octets is utilized for testing the memory 1, for example upon restoring the supply to the camera to this end, they are read and compared to a message retained in the package, for example of THOMSON-CSF-TELEVISION; a test of the parity check type on the values contained in the memory 1 is equally possible by means of these octets left unoccupied by the correction signals.

If the test performed in this manner are inconclusive, that is to say if the contents of the memory 1 had not been safeguarded, the contents of the memory 1 should be reorganized, which is performed during an acquisition operation.

The correction arrangement according to FIG. 2 thus corresponds to a conventional level correction arrangement, but in which the correction points are not established by a constant-pitch image grid but by a varying pitch image grid. This leads to different addressing of the correction data as a function of image scanning. It should be noted moreover that the counter 6 has particular features of interest and is described in more detail with reference to FIG. 6.

Figure 3:
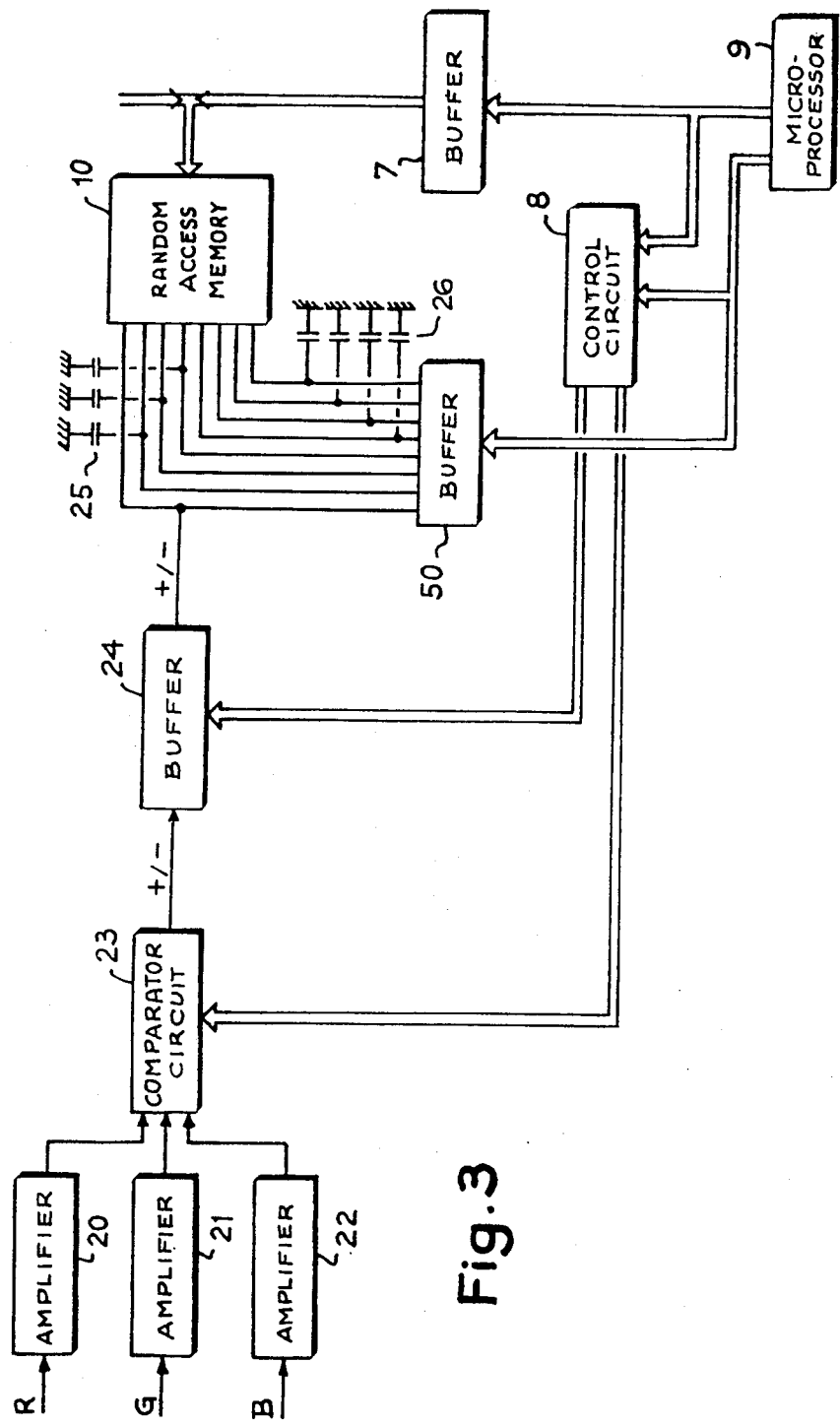
FIG. 3 illustrates an arrangement for obtaining correction signals in a device according to the invention.

The acquisition of the correction data is performed by means of the circuits illustrated in FIG. 3. The video frequency signals corrected as a function of the contents of the six memories such as 1 (FIG. 2) and corresponding to the three primary colors (red R, green G and blue B) respectively are amplified by three amplifiers 20, 21, 22. Consequently, this is a loop operation since these are the signals corrected as a function of the contents of the memories such as 1 which are taken into account in the acquisition procedure in order to evaluate the contents of these memories in accordance with the program which will be specified in the following. A comparator circuit 23 comprising an input selector controlled by the control circuit 8, selects one of the three video frequency signals R,G,B. The comparator circuit 23 performs a comparison between the video frequency signal selected and a reference signal which in the example described is the video frequency signal selected, after correction, in the central portion of the image, but which may be a predetermined reference voltage. The results appear in the form of information with the notation +/− in FIG. 3. The +/− information is the result of a comparison between the video frequency voltage and the reference voltage. It has the value logic 1 when the video frequency voltage exceeds the reference voltage, and the logic 0 value in the contrary case.

Figure 4:
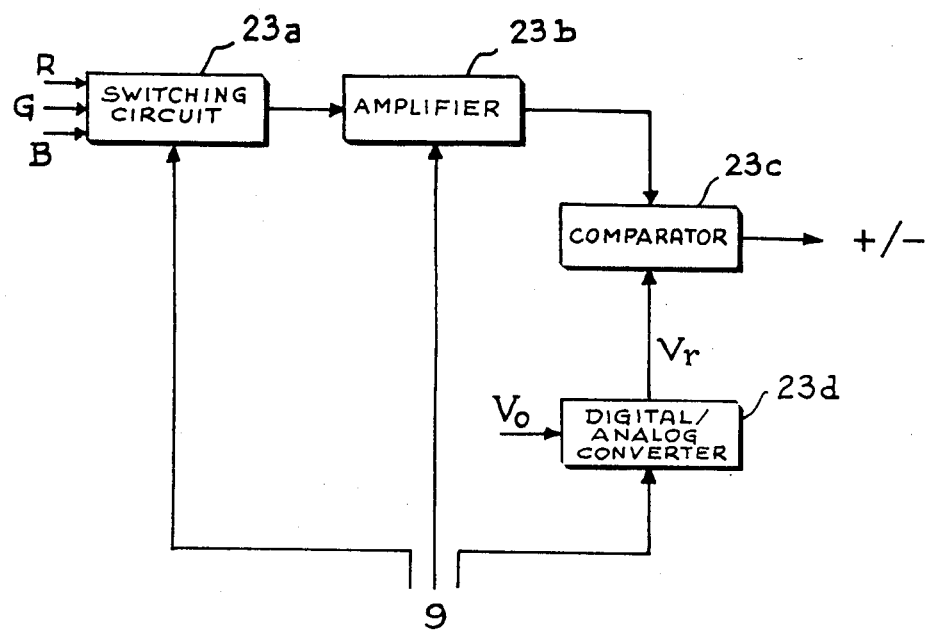
FIG. 4 illustrates a more detailed diagram of an element of FIG. 3.

FIG. 4 shows an embodiment of the comparator circuit 23 of FIG. 3. A switching circuit 23a makes it possible, under control by the microprocessor 9, to select one of the three amplified video frequency signals R,G,B. The signal selected is fed to the input of an amplifier 23b having two gain levels switchable under control by the microprocessor 9, namely a gain equal to 1 for correction of a white video signal and gain equal to 6 for correction of a black video signal. The output signal of the amplifier 23b is fed to the first input of a comparator 23c which, at its second input, receives a reference voltage Vr supplied by a digital/analog converter 23d. The reference voltage of the digital/analog converter is a constant voltage Vo and its input signal is provided by the microprocessor in the manner specified in the following.

The +/− information is transmitted via a buffer 24 controlled by the circuit 8 into a random access memory 10 which forms the memory for data acquisition of the level correction device. This memory is identical to the memory 1 of FIG. 2. The octet of the rank I,J of the memory 10 in which is to be stored the information supplied by the circuit 23 at a given instant, is illustrated diagrammatically in FIG. 5. The information for comparison supplied by the circuit 23 is placed at the zero position in the octet. To this end, the access point of the memory 10 permitting this information input is connected to the buffer 24, whereas seven capacitors 25,26 are connected to the other $8-1=7$ access points. The memory 10, via its data read output buffers, charges the seven capacitors in such a manner as to store the information for the purpose of rewriting the same with the information coming from the circuit 24, approximately 100 nanoseconds later.

The positions 1 to 7 of the octet according to FIG. 5 are marked VIJ; these are filled as a function of successive comparisons performed in the circuit 23 as stated in the program described in the following.

Acquisition of the correction data is performed at the television repetition rate thanks to the counter 6.

The purpose of the microprocessor 9 (FIGS. 2 and 3) is to trigger an information acquisition procedure, to sample the data in the memory 10 (FIG. 3) and, in accordance with the program, to route these by successive stages into the memory 1 (FIG. 2) for the correction which is to be established. The intention in this procedure is to determine the correction signals of each primary color for the black spot and for the white spot.

During a first stage, the microprocessor 9 controls the comparator circuit 23 via the input digital/analog converter 23d of this circuit, as a function of the predetermined reference voltage already referred to in the foregoing, in order to obtain the video voltage of a central area of the image as a final reference voltage. To this end, the corrections are fed to the input digital converter of the comparator circuit 23.

By starting from the correction point at the center of the image and by retaining the final reference voltage of the first stage, it is possible during a second stage to perform a so-called "cruciform" adjustment. That is to say, to determine a correction value for the specified variable division correction points situated on the same horizontal line on the one hand, and on the other hand on the same vertical as the initial correction point. The microprocessor 9 then calculates the other points by establishing a mean for each point of the correction values of the two points of the cross situated, respectively, on the same vertical and on the same horizontal as the point in question.

A third stage may optionally be possible by completing the treatment by means of the values acquired at the edges of the image, and a fourth stage is possible by completing the processing of all the values acquired, and during a fifth stage, the microprocessor may perform a spatial filtering action for each correction point on the correction signal as a function of the correction signals of 4,8 or more surrounding correction points. This enables the prevention of unequal jumps or of too random a nature of the correction, which for example derive from a marking of the image analyzer (punctiform tube defect).

The program specified in the following shows that the first stage of the acquisition procedure (point at the center of the image) is implemented by assuming:

$$LO = LN = \frac{SIZEVT}{2} \quad (SIZEVT: \text{vertical dimension})$$

$$KO = KN = \frac{SIZEHO}{2} \quad (SIZEHO: \text{horizontal dimension})$$

The processing oepration is performed over a small central area of the image, by consideration in this same program of $$LO = \frac{SIZEVT}{2} - a (\text{with } a = 1 \text{ or } 2 \text{ or } 3 \ldots)$$

$$LN = \frac{SIZEVT}{2} + a$$

$$KO = \frac{SIZEHO}{2} - b (\text{with } b = 1 \text{ or } 2 \text{ or } 3 \ldots)$$

$$KN = \frac{SIZEHO}{2} + b$$

FIG. 6 shows an embodiment of the counter 6 of FIG. 1 which provides the addresses of the six memories such as 1 (FIG. 2), and of the memory 10 (FIG. 3). An oscillator 62 driven by a crystal 61 having a stability of $10^{-4}$, delivers an output signal at 64 MHz. The feature of the counter 6, for equipment of this nature, is that the crystal 61 operates "autonomously" that is to say without positive control in the oscillator 62. This "autonomous" operation sets up a jitter of a period of say 16 nanoseconds, which is no drawback in the application in question and causes particular interference couplings produced during the switching of the signal to become non-stationary. A first divider circuit 63 having a dividing ratio equal to 16 delivers signals at 4 MHz of which one is conveyed to the microprocessor 9, which equally receives the pulses at the frame frequency Fv, for establishing a synchronous operation of the microprocessor. The divider circuit 63 is followed by a second divider circuit 64, having a dividing ratio equal to 128. These two divider circuits are reset to zero by pulses at the line frequency Fl, coming from the analyzer and, in conjunction with a programmable decoder 66 operated by the control circuit 8, they determine the characteristic instants of the line which divide the line into segments of 0.5 μS and 1 μS depending on the variable horizontal division referred to in particular in the description of FIG. 1. A counter circuit 65 formed by a 12-stage counter, counts the pulses at line frequency Fl, and is reset to zero by pulses at frame frequency Fv coming from the camera. In association with the decoder 66, the counter circuit 65 determines the characteristic instants which divide the image vertically into strips of one line or four lines depending on the vertical division referred to in particular in the description of FIG. 1. The decoder 66 may thus provide temporal scrutiny of the memories 1 and 10, which have a variable division, that is to say which have a variable period, but with a continuous progression within the addressing space of the memories.

The present invention is not limited to the example described. Thus, in particular, it may be applied for correction of level defects caused by a tube for reception of the television image or by a screen for projection of this image. In this case, the video frequency signals are modified to make allowance for the defects occurring after this modification in the restored image.

The acquisition program referred to in the foregoing is specified in the following; it is described in PASCAL language and comprises 74 lines:

```
                       MOTOROLA PASCAL 2.00
LINE    LOC  LEV  BE   PROCESSING SA 04/06/83 14:03:38
 1(      0)   0)   —   PROGRAM PROCESSING;
 2(      0)   0)   —
 3(      0)   0)   —   CONST SIZE = 8000;
 4(      0)   0)   —   SIZEHO = 62;
 5(      0)   0)   —   SIZEVT = 128;
 6(      0)   0)   —   MIN = 0;
 7(      0)   0)   —   MAX = 127;
 8(      0)   0)   —   TYPE LINE = 1..SIZEHO;
 9(      0)   0)   —   FIELD = 1..SIZEVT;
10(      0)   0)   —   FILTER = MIN..MAX;
11(      0)   0)   —   BYTE = RECORD
12(      0)   0)   —   A:BOOLEAN;
13(      0)   0)   —   B:FILTER;
14(      0)   0)   —   C:BOOLEAN;
15(      0)   0)   —   D:FILTER
16(      0)   0)   —   END;
17(      0)   0)   —   RAM 10 = ARRAY [LINE, FIELD]
                       OF BYTE;
18(      0)   0)   —
19(     -3)   0)       VAR I,KO,KN:LINE;
20(    -10)   0)   —   J,LO,LN:FIELD;
21(    -12)   0)       V:BOOLEAN;
22(    -14)   0)   —   VIJ:FILTER;
23(    -16)   0)       A:1..255;
24(    -16)   0)   —
25(      0)   1)       PROCEDURE RESET; FORWARD;
26(      0)   1)   —
27(      0)   1)   —   PROCEDURE DECREMENT;
                       FORWARD;
28(      0)   1)   —   (*"A" VALUE DECRE-
                       MENTING FOR CORRECTION
                       MEMORY AT Y LINE
29(      0)   1)   —   AND Z FIELD RANGE.
30(      0)   1)   —   POSSIBLE FORWARD NOTION OF
31(      0)   1)   —   RESTORED RANGE.*)
32(      0)   1)   —
33(      0)   1)   —   PROCEDURE INCREMENT;
                       FORWARD;
34(      0)   1)       (*"A" VALUE INCRE-
                       MENTING FOR CORRECTION
                       MEMORY AT Y LINE
35       0)   1)   —   AND Z FIELD RANGE.
36(      0)   1)   —   POSSIBLE FORWARD NOTION OF
37       0)   1)   —   RESTORED RANGE.*)
38(      0)   1)   —   PROCEDURE AVERAGE (
39(      0)   1)       VAR X:BOOLEAN;
40(      0)   1)   —   XI;FILTER);
41(     -1)   1)   —   VAR H:BOOLEAN;
42       1)   1)  A—  BEGIN
43       2)   1)   —   IF X = FALSE THEN
44       )    1)  B—  BEGIN
45       3)   1)   —   IF XI < > MIN THEN
46       4)   1)   —   XI: = XI - 1
47       )    1)   —   ELSE;
48       )    1)  —B  END
49       )    1)   —   ELSE
50       5)   1)   —   IF XI < > MAX THEN
51       6)   1)   —   XI: = XI + 1
52       )    1)   —   ELSE;
53       7)   1)   —   H: = (XI < > MIN);
54       8)   1)   —   H: = (X OR H);
55       9)   1)   —   IF H = FALSE THEN
56      10)   1)   —   DECREMENT;
```

```
                       -continued
                       MOTOROLA PASCAL 2.00
LINE    LOC  LEV  BE   PROCESSING SA 04/06/83 14:03:38
57      11)   1)   —   H: = (XI = MAX);
58      12)   1)   —   H: = (X AND H);
59      13)   1)   —   IF H = TRUE THEN
60      14)   1)   —   INCREMENT;
61            1)  —A   END;
62            1)   —
63            1)   —
64      15)   0)  A—  BEGIN (*PROGRAM*)
65      16)   0)   —   RESET;
66      17)   0)   —   FOR J: = LO TO LN DO
67            0)  B—  BEGIN
68      18)   0)   —   FOR I: = KO TO KN DO
69            0)  C—  BEGIN
70      19)   0)   —   A: = 1;
71      20)   0)   —   AVERAGE (V,VIJ);
72            0)  —C   END;
73            0)  —B   END
74            0)  —A   END.
```

***INCREM ASSUMED EXTERNAL
***DECREM ASSUMED EXTERNAL
***RESET ASSUMED EXTERNAL

I claim:

1. A method of correcting level defects in a television image, said method comprising the steps of:
   dividing the image into a predetermined number of correction points forming a grid of vertical and horizontal bands, said grid having a varying pitch which determines correction points spaced apart from each other at different distances, the length of the pitch of the grid being smaller towards the edges of the image than at the center of the image;
   storing correction data for each correction point during an acquistion precedure; and
   correcting video frequency signals relating to a correction point by combining them with the correction data stored for the correction point.

2. The method according to claim 1, wherein in said dividing step, for each correction point, the frequency corresponding to the length.of the pitch is selected to be at least equal to twice the highest frequency from among n lines of a variation spectrum corresponding to each correction point, n being positive integer.

3. A device for correcting television image level defects wherein corrections are made on television signals at video frequency in order to correct the image level defects, said device comprising:
   memory assembly means for storing correction data for the corrections which are to be made;
   scrutiny circuit means for scrutinizing said memory assembly means with a variable temporal pitch for selecting data in the memory assembly means;
   correction means for combining the data selected by said scrutiny circuit means with the video frequency signals; and
   control means including a microprocessor for controlling said scrutiny circuit means, said correction means and said memory assembly means.

4. A device according to claim 3, further comprising an acquisition assembly means for acquisition of the correction data and which comprises a comparator circuit such that during an acquisition procedure, a video frequency signal derived from a reference view is received and compared to a reference signal, for producing signals (+/−) which represent the difference between the video frequency signal and the reference signal, and a memory circuit for storing the signals produced by the comparator circuit and subsequently providing the stored signals to said memory assembly means.

5. A device according to claim 3, wherein said scrutiny ciruit means comprises: a quartz oscillator, followed by frequency dividers reset to zero by line frequency pulses relating to the television image; a counter circuit which counts the line frequency pulses and is reset to zero by frame frequency pulses relating to the televisin image; and a decoder for receiving the output signals of the frequency dividers and of the counter circuit and for supplying storage addresses to said memory assembly means.

* * * * *